(12) United States Patent  (10) Patent No.: US 8,454,095 B1
Dilts et al.  (45) Date of Patent: Jun. 4, 2013

(54) APPARATUS FOR UNLOADING BULK MATERIALS

(75) Inventors: Mark David Dilts, Los Angeles, CA (US); James M. Geraets, Sioux Falls, SD (US); D. Owen Whitehouse, Colman, SD (US)

(73) Assignee: POET Research, Inc., Sioux Falls, SD (US)

( * ) Notice: Subject to any disclaimer, the term of this patent is extended or adjusted under 35 U.S.C. 154(b) by 286 days.

(21) Appl. No.: 12/757,848

(22) Filed: Apr. 9, 2010

Related U.S. Application Data (60) Provisional application No. 61/168,328, filed on Apr. 10, 2009.

(51) Int. Cl.
*B60P 1/00* (2006.01)
(52) U.S. Cl.
USPC .......................................................... 298/1 B
(58) Field of Classification Search
USPC ................... 298/1 B, 1 A, 18; 414/393, 509, 414/539, 527; 220/1.6
See application file for complete search history.

(56) References Cited

U.S. PATENT DOCUMENTS

| 4,314,788 | A | * | 2/1982 | Williams et al. |
| 5,295,779 | A | * | 3/1994 | Mihalich et al. |
| 6,824,223 | B2 | * | 11/2004 | Davidovic ................... 298/1 B |
| 6,974,296 | B2 | * | 12/2005 | Simrin |

OTHER PUBLICATIONS

Smithco MFG. CO., Inc. "SmithCo Side-Dump Trailers—Model CH-5325DT SmithCo Side-Dump Trailer", LeMars, Iowa, 2 pages.

* cited by examiner

*Primary Examiner* — Stephen Gordon
(74) *Attorney, Agent, or Firm* — Turocy & Watson, LLP

(57) ABSTRACT

A system for treating biomass for the production of ethanol is disclosed. The system comprises an apparatus for unloading bulk material, comprising: a liner positioned against a wall and a floor; wherein the floor comprises an outer edge and an inner edge; wherein the wall comprises an upper edge and a lower edge; wherein the liner comprises an upper edge and a lower edge; wherein the liner can be in a first position or a second position; wherein the bulk material is loaded onto the liner in the first position; and wherein the liner is moved into the second position to facilitate the unloading of the bulk material. The apparatus for unloading bulk materials may comprise one or more cables to move the liner. The apparatus for unloading bulk materials may also comprise a mechanism to retract the one or more cables wherein the mechanism comprises a roller system.

24 Claims, 8 Drawing Sheets

APPARATUS FOR UNLOADING BULK MATERIALS

CROSS REFERENCE TO RELATED APPLICATIONS

The present application claims priority to and incorporates by reference the following application: U.S. Provisional Application Ser. No. 61/168,328, titled "VEHICLE FOR HAULING BIOMASS", filed on Apr. 10, 2009.

FIELD

The present invention relates generally to an apparatus for unloading bulk material from a transport container. The present invention also relates to a liner configured to move bulk material in a direction that facilitates unloading of a transport container. The present invention further relates to a liner and a sidewall that operate together to facilitate unloading of bulk material from a transport container.

BACKGROUND

Bulk material can exhibit varying flow characteristics based on differences in the characteristics of the particles that comprise the bulk material. Examples of characteristics of particles that may affect flow are size, shape, texture, and density. External factors such as humidity, precipitation (if materials are stored outside), and temperature can further influence the characteristics of the particles and their resulting flow ability. Settling of bulk material in storage will also impact the flow characteristics. Flow ability issues that result from particle differences comprise nesting, caking, and bridging. Transportation of the material can further exacerbate these flow ability issues by causing additional settling and nesting due to vibration of the material caused by movement. Bridging, enhanced by the nesting of the material, typically is exhibited when the bulk material is exiting a container. This nesting and resulting bridging effect may be due to the composition, texture, or density of the bulk material in addition to restriction points of the container being unloaded. The nesting and resulting bridging inhibits the flow ability of the bulk material.

Bulk material can be moved to a location of use or storage in a transport container such as a tractor-trailer. When the transport container arrives at the location, the bulk material is unloaded from the transport container for storage or processing. Existing transport containers and unloading systems each have independent issues with handling bulk materials. For example, gravity drop trailers can experience hopper plugging during unloading due to the bridging effects over a small opening. Trailers with conveyor floors, in addition to bridging issues that may occur over the conveyor, have mechanically complex components which can increase purchase costs and maintenance costs. Trailers with walking-beam floors have moving parts and can have more components which can make trailers with walking-beam floors subject to increased equipment failures as compared to other trailers. Side-dump trailers with slightly annular cross-sectional shape limit the hauling capacity of side-dump trailers as compared to box style trailers. Box style side-dump trailers in which the entire box is tilted to facilitate unloading the material have moving parts and can have more components which can make these trailers subject to increased equipment failures.

Biomass is an example of bulk material. Biomass comprises plant matter that can be suitable for direct use as a fuel/energy source or as a feedstock for processing into another bioproduct (e.g. a biofuel such as cellulosic ethanol) produced at a biorefinery (such as an ethanol plant). Biomass may comprise, for example, corncobs and stover (e.g. stalks and leaves) made available during or after harvesting of the corn kernels. In order to be used or processed, biomass will be harvested and collected from the field and transported to the location where it is to be used or processed. Biomass (such as corncobs and stover) may be collected and stored in piles at the edge of the field. The piles of biomass are then collected and transported from the field to the location of intended use or processing.

It would be advantageous to provide for an apparatus for unloading bulk material. It would also be advantageous to provide for an apparatus for unloading bulk material from a transport container. It would also be advantageous to provide for high volume unloading of bulk material that can mitigate plugging of the bulk material within the transport container while facilitating flow of the bulk material out of the transport container. It would be further advantageous to provide for an apparatus for unloading bulk material that has few components and few moving parts.

SUMMARY

The present invention relates to an apparatus for unloading bulk material, comprising: a liner positioned against a wall and a floor; wherein the floor comprises an outer edge and an inner edge; wherein the wall comprises an upper edge and a lower edge; wherein the liner comprises an upper edge and a lower edge; wherein the liner can be in a first position or a second position; wherein the bulk material is loaded onto the liner in the first position; and wherein the liner is moved into the second position to facilitate the unloading of the bulk material.

The present invention relates to an apparatus for unloading bulk material, comprising: a container for storing or transporting the bulk material; a liner positioned inside the container against a wall and a floor; wherein the container comprises at least one door; wherein the floor comprises an outer edge and an inner edge; wherein the wall comprises an upper edge and a lower edge; wherein the liner comprises an upper edge and a lower edge; wherein the liner can be in a first position or a second position; wherein the bulk material is loaded onto the liner in the first position; and wherein the liner is moved into the second position to facilitate the unloading of the bulk material.

The present invention further relates to an apparatus for unloading bulk material, comprising: a container for storing or transporting the bulk material; a liner positioned inside the container against a wall and a floor; wherein the container comprises a door; wherein the floor comprises an outer edge and an inner edge; wherein the wall comprises an upper edge and a lower edge; wherein the liner comprises an upper edge and a lower edge; wherein the door is attached to the outer edge of the floor; wherein the liner can be in a first position or a second position; wherein the bulk material is loaded onto the liner in the first position; and wherein the liner is moved into the second position to facilitate the unloading of the bulk material.

DESCRIPTION OF THE EMBODIMENTS

As shown in FIGS. 1A through 1D, bulk material 102 can be loaded on top of a liner 104, which can then be used to unload the material. The bulk material can be, for example, biomass that may comprise corn cobs, corn stover and husks (e.g., leaves). Biomass particles may be uneven in size (e.g., ranging from less than 1 cm to more than 15 cm in diameter or length) and texture, and typically exhibit nesting and bridging characteristics, which may cause problems with flow ability.

Figure 1A:
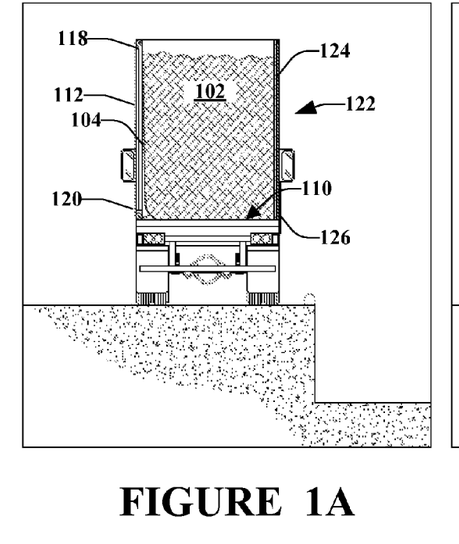
FIGS. 1A through 1D are schematic illustrations of an apparatus for unloading bulk materials according to an embodiment.
Figure 1B:
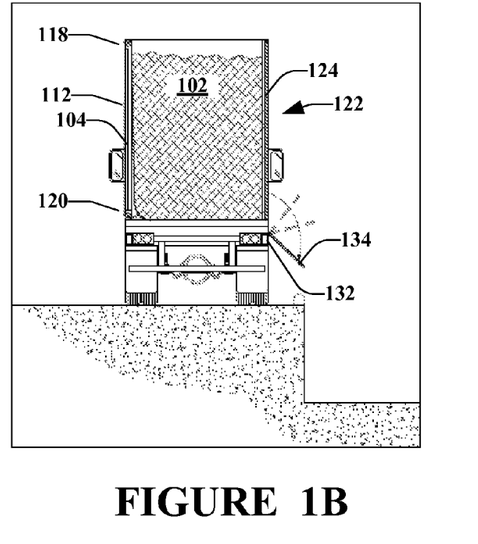
Figure 1C:
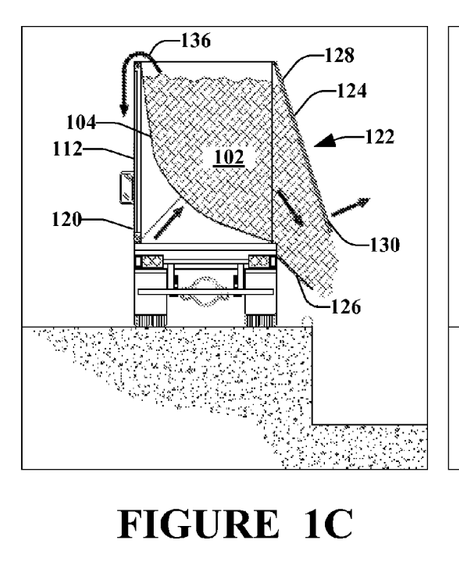
Figure 1D:
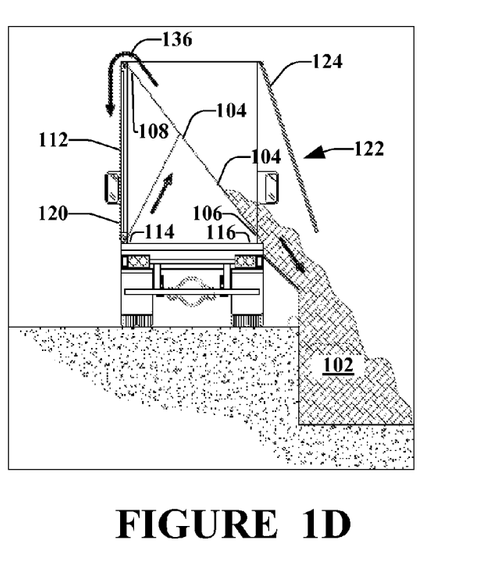

The liner 104 comprises a lower edge 106 and an upper edge 108. FIGS. 1A and 1B show the liner in a first position (or load position) and FIGS. 1C and 1D show the liner in a second position (or unload position). In the load position, the liner 104 is positioned against a floor 110 and a wall (lined wall 112), lining the bottom and one side of the space, where bulk material 102 is loaded. The floor 110 comprises an inner edge 114 and an outer edge 116. The lined wall 112 comprises an upper edge 118 and a lower edge 120. The bulk material 102 may be loaded onto the liner 104 for example for storage or transportation. The space may be enclosed by other walls, where the wall opposite of the lined wall comprises an opening 122 through which the bulk material 102 may be unloaded.

According to an embodiment, the opening 122 comprises two parts, an upper door 124 and a lower door 126. The upper door 124 may be hinged at the top 128, allowing the upper door 124 to open at the bottom 130. The lower door 126 may be hinged at the bottom 132, allowing the lower door 126 to open at the top 134. FIG. 1B shows opening of the lower door. According to an exemplary embodiment, the height of the upper door is equal or approximately equal to the height of the lined wall, and the height of the lower door is less than the height of the upper door, and the lower door overlaps with the upper door in a closed position. According to another exemplary embodiment, the height of the lower door is less than 50 percent of the height of the upper door. According to an embodiment, the lower door may be used to retain the upper door in a closed position.

According to an embodiment, as shown in FIGS. 1C and 1D, the liner 104 may be moved into the unload position, forming an incline between the upper edge 118 of the lined wall 112 and the outer edge 116 of the floor 110. The incline (e.g. in the unload position) causes the bulk material 102 to slide off the liner 104 and to unload. According to an exemplary embodiment, as shown in FIG. 1C, the liner may be moved into the unload position by pulling on the top of the liner as indicated by arrow 136.

According to an exemplary embodiment, as shown in FIGS. 1A through 8C, the liner may be located in a transport container that is used to load, transport, and unload bulk material. According to other exemplary embodiments, the liner may be located in other areas, where bulk materials are loaded and unloaded, such as storage areas or temporary storage areas.

Figure 2A:
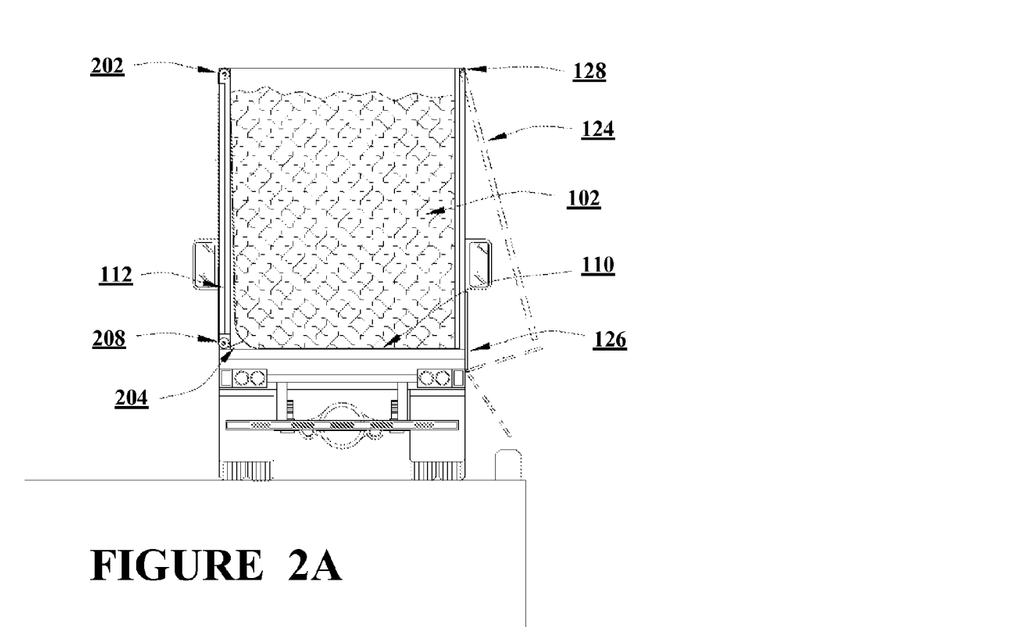
FIGS. 2A and 2B are schematic views of an embodiment of an apparatus for unloading bulk materials from a transport container.
Figure 2B:
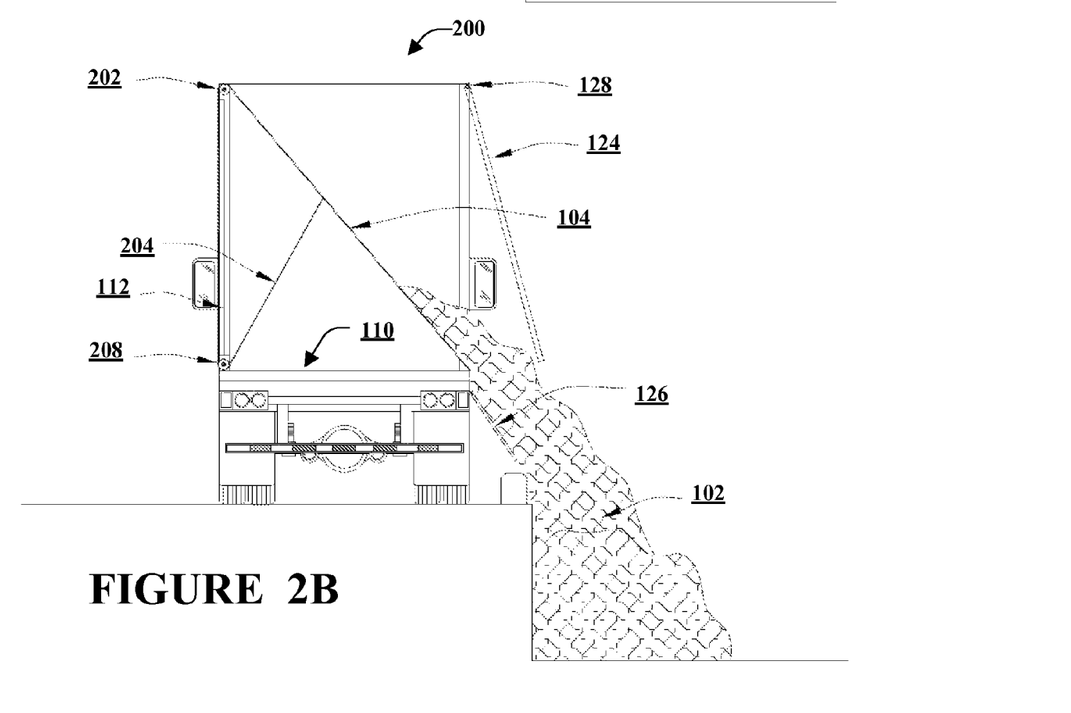

As shown in FIGS. 2A and 2B, a roller mechanism 202 may be used to retract the liner and pull it into the unload position. A cable, a set of cables, or a continuous piece of material 204 may be attached to the liner and may be used to connect the liner 104 to the bottom of the lined wall 112. According to an embodiment, the continuous piece of material is horizontally attached to the liner. The cable, set of cables or continuous piece of material 204 may be used to return the liner to a load position. Another mechanism 208 (or a motor. According to another exemplary embodiment, the powered roller mechanism is powered by a manual gear mechanism.

Figure 3A:
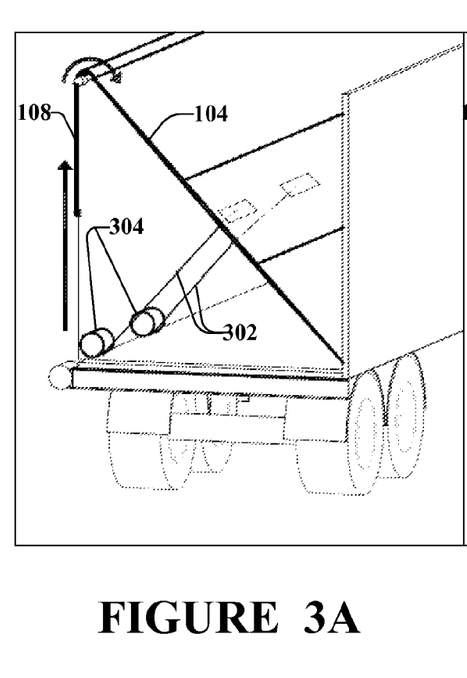
FIGS. 3A through 3C are schematic perspective views of a transport container that employs an apparatus for unloading bulk materials according to an embodiment.
Figure 3B:
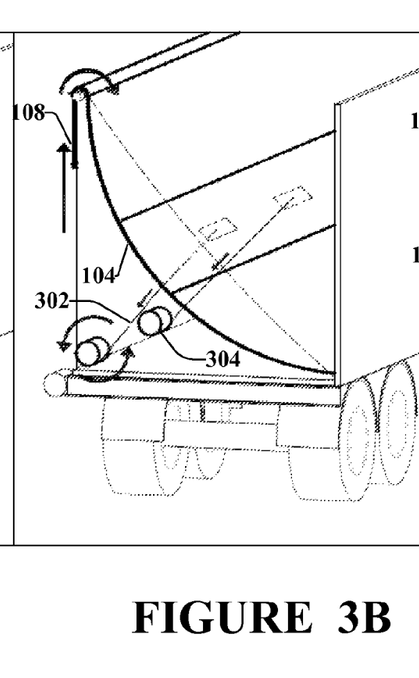
Figure 3C:
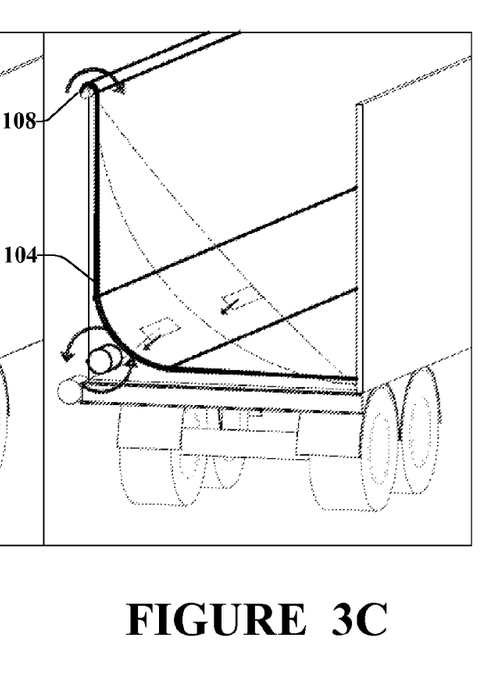

Referring to FIGS. 3A through 3C, an exemplary embodiment of a roller mechanism to retract a set of cables at the bottom of the lined wall is shown. As shown in FIGS. 3A through 3C, the liner 104 may be moved to the unload position by pulling the upper edge 108 of the liner 104 over the top (or upper edge 118) of the lined wall 112 and down the outside of the lined wall. When the liner 104 is in the unload position, the cables 302 are extended from the rollers 304. The roller mechanism may be rotated to retract the cables 302, thus returning the liner 104 to the load position and pulling the upper edge 108 of the liner 104 up along the outside of the lined wall.

Figure 4A:
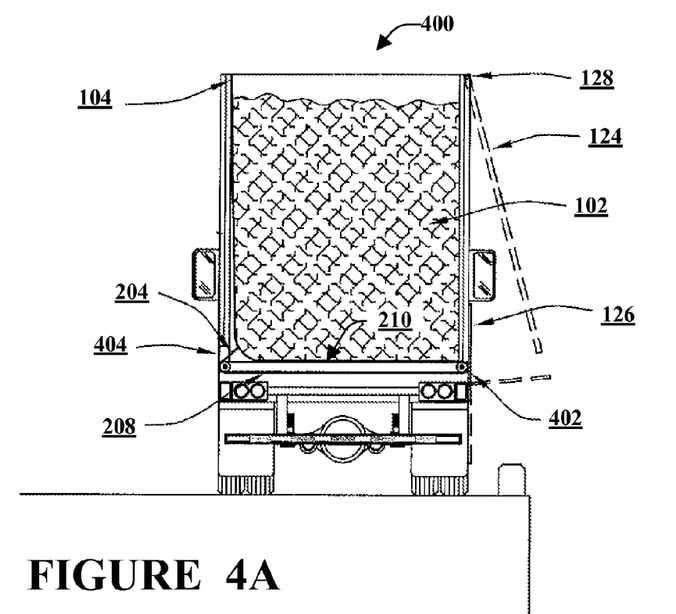
FIGS. 4A and 4B are schematic views of another embodiment of an apparatus for unloading bulk materials from a transport container.
Figure 4B:
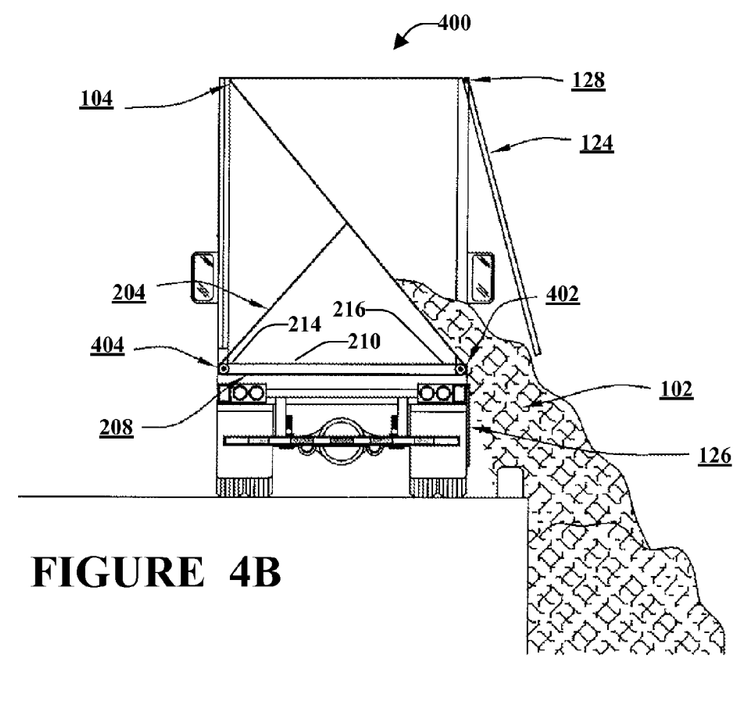

Referring to FIGS. 4A and 4B, an embodiment of the apparatus 400 is shown, where the roller mechanisms 402 are located near the floor 110 of the lined space. The roller mechanism 402 used to move the liner 104 to the unload position is located near the outer edge 116 of the floor and is used to pull the liner 104 outward and downward. The roller mechanism 404 used to retract the cable, set of cables, or continuous piece of material 204 is located at the inner edge 114 of the floor 110.

Figure 5A:
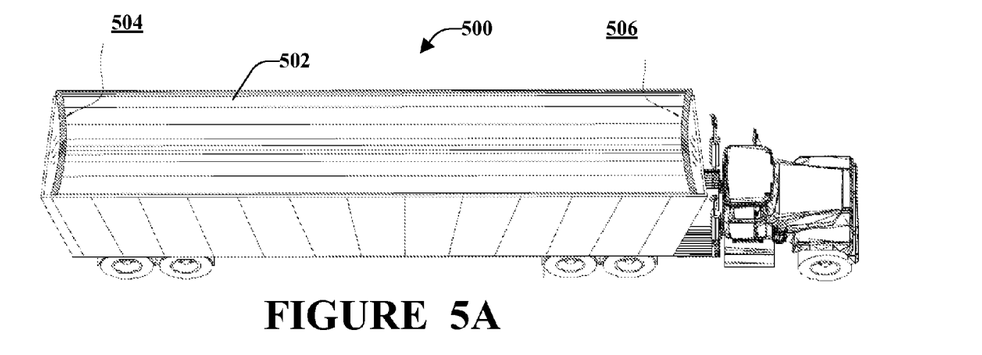
FIGS. 5A through 5C are schematic perspective top views of a transport vehicle that employs an apparatus for unloading bulk materials according to an embodiment.
Figure 5B:
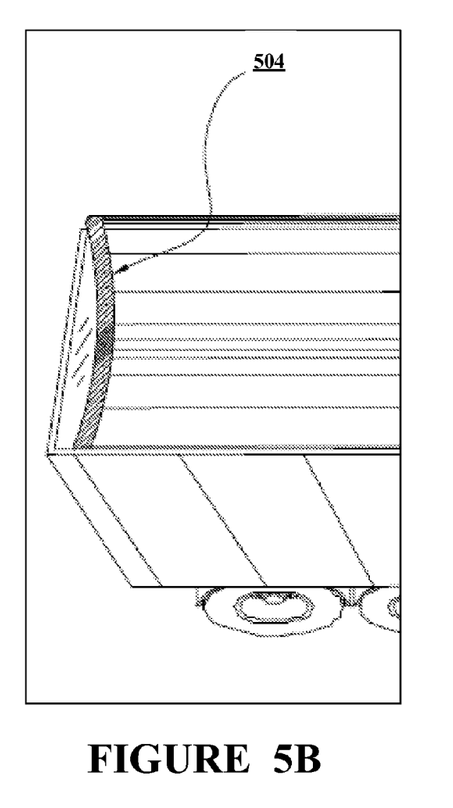
Figure 5C:
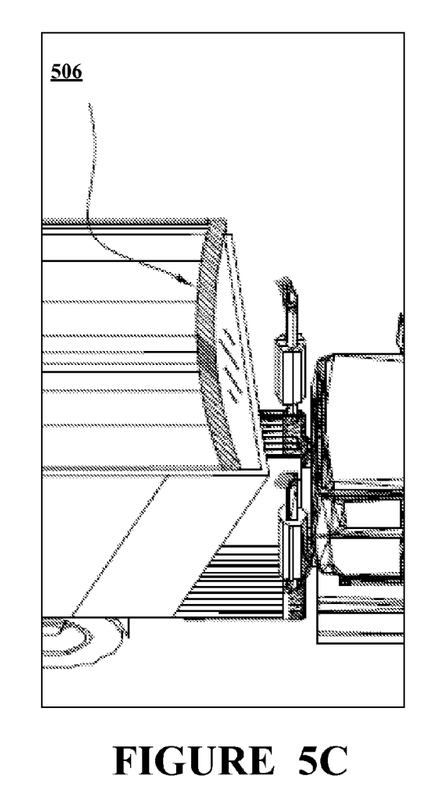

FIGS. 5A through 5C show an aerial view of a transport container 500 comprising a liner 502 according to an embodiment. The liner 502 is used to line one wall (e.g. a longitudinal wall) and the floor of the transport container. The liner 502 may be configured so that it is in contact with (but not attached to) the adjoining walls 504, 506, forming a seal that prevents material from falling behind or under the liner 502.

Figure 6A:
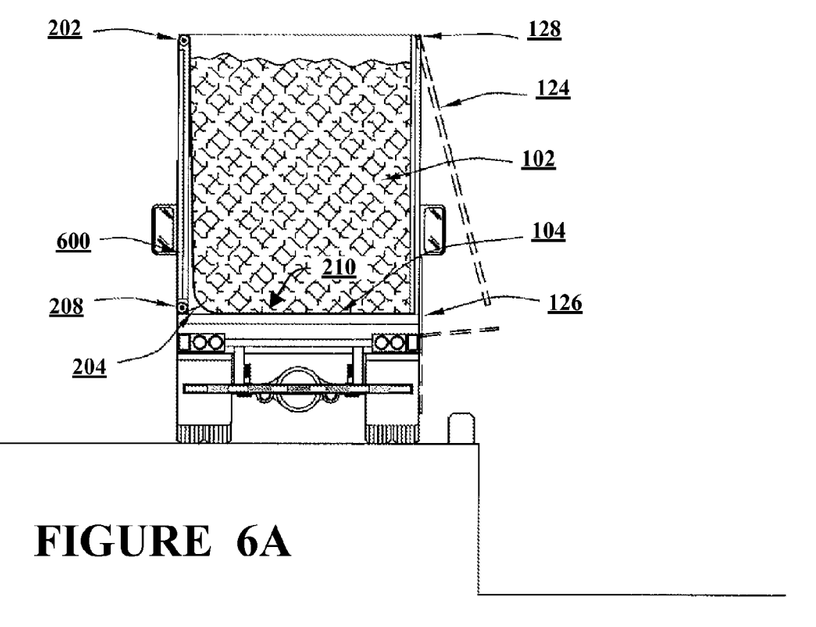
FIGS. 6A and 6B are schematic views of an embodiment of an apparatus for unloading bulk materials.
Figure 6B:
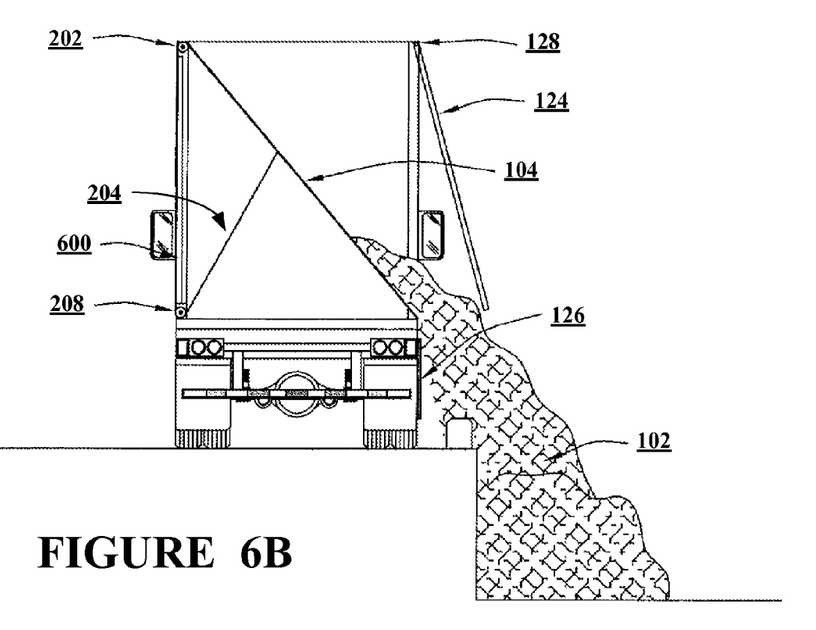

Referring to FIGS. 6A and 6B, the lower door 126 may be configured so that it can turn outward in a 180 degree angle into an open position. In an exemplary embodiment, where the door is the door of a transport container 600 and the transport container is positioned atop a bed of a transport vehicle, the lower door 126 may lay against the side of the transport vehicle. In another exemplary embodiment, the lower part of the door will open into an angle of about 90 to 180 degrees from the closed position. In a preferred embodiment, the lower part of the door will open into an angle that forms a continuous plane with the liner when it is in the unload position as shown in FIG. 2B. In another preferred embodiment, the lower part of the door can be used to guide the unloading bulk material into a desired location.

Figure 7A:
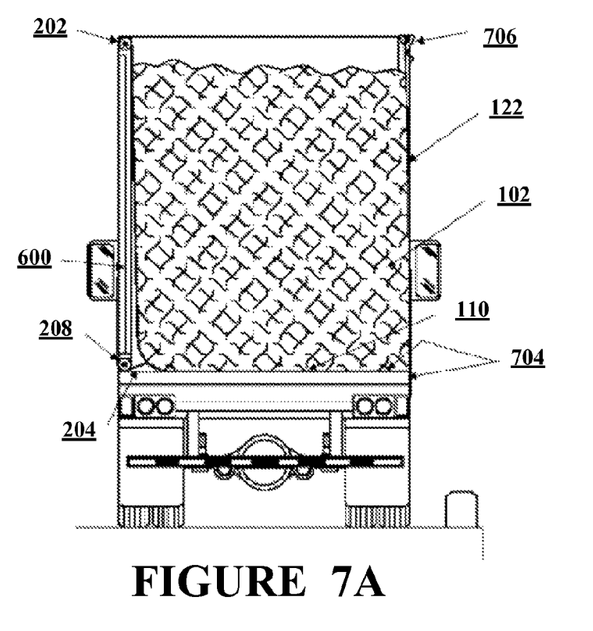
FIGS. 7A and 7B are schematic views of a further embodiment of an apparatus for unloading bulk materials.
Figure 7B:
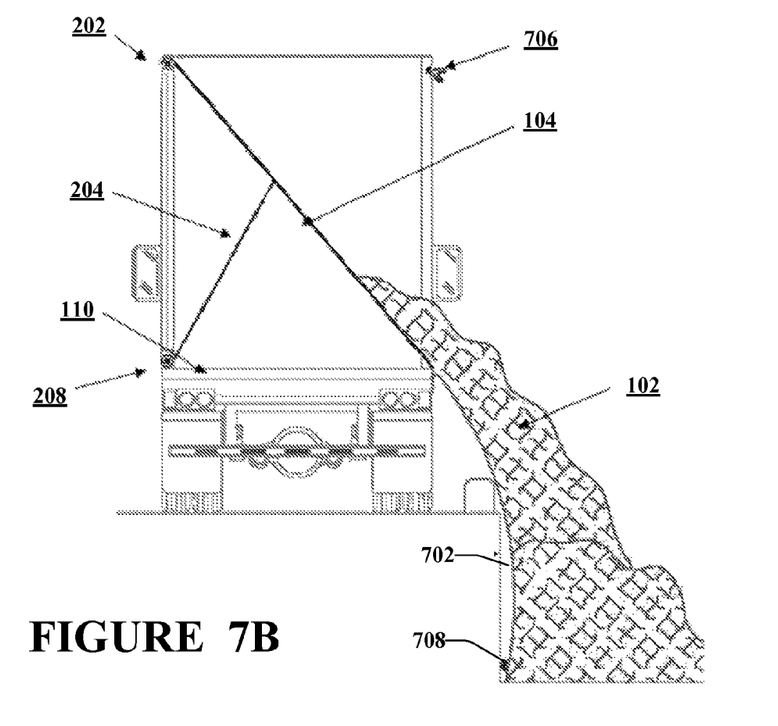
Figure 8:
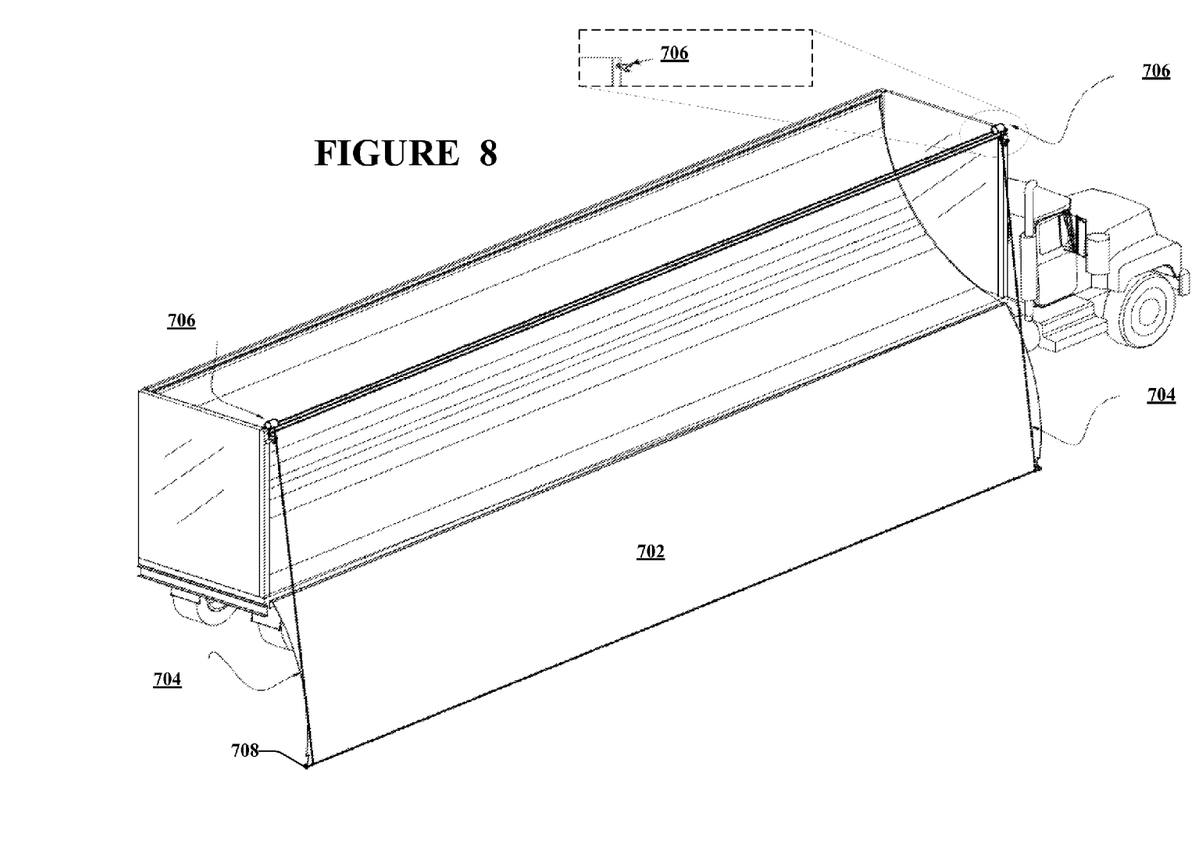
FIG. 8 is a schematic perspective view of a transport vehicle that employs an apparatus for unloading bulk materials according to an embodiment.

As shown in FIGS. 7A, 7B and 8, the door may be constructed of a piece of material 702 that is attached 704 at the bottom of the opening. The door can open outward and downward and may be used to guide the unloading bulk material into a desired location. In an exemplary embodiment, the door is constructed of a flexible material. In a closed position, an upper part of the door may be attached to the sides and/or the top of the opening to prevent material from falling out. According to exemplary embodiments, the door may be attached to the sides and/or the top of the opening by a closing mechanism or zip mechanism 706, such as a keder strip, keder rail, zip-lock type mechanism, or a clamp mechanism. In an exemplary embodiment, the door can be retained in a closed position by a clamp mechanism or a sealing mechanism. According to some aspects, the door may comprise a stiffening rod 708 (e.g., a steel rod) attached to the top edge of the flexible door.

According to an exemplary embodiment, the liner may be constructed of a flexible material, such as fabric (e.g. canvas), rubberized fabric, reinforced fabric, reinforced rubber, or a similar material. According to another embodiment, the liner may be constructed of an inflexible material, such as metal (e.g. longitudinally connected flat pieces of metal), or a combination of two or more materials, such as fabric, plastic, rubber, fiberglass or metal.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

It is important to note that the construction and arrangement of the elements of the disclosed subject matter as described in the detailed description and as shown in the figures is illustrative only. Although some embodiments have been described in detail, those skilled in the art who review the disclosure will readily appreciate that many modifications are possible (e.g. variations in size, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures and combinations. Accordingly, all such modifications are intended to be comprised within the scope of the disclosed subject matter. Other substitutions, modifications, changes and omissions may be made in the design, operating conditions and arrangement of the exemplary embodiments without departing from the spirit of the present invention.

What is claimed is:

1. An apparatus for unloading bulk material, comprising:
a liner positioned against a first sidewall and a floor of a container;
wherein the floor comprises an outer edge and an inner edge;
wherein the first sidewall comprises an upper edge and a lower edge;
wherein the liner comprises an upper edge attached to the upper edge of the first sidewall and a lower edge attached to the outer edge of the floor;
wherein the liner can be in a first position or a second position;
wherein the bulk material is loaded onto the liner in the first position; and
wherein the liner is moved into the second position to facilitate the unloading of the bulk material toward a second sidewall that is parallel to the first sidewall.

2. The apparatus of claim 1, wherein the liner forms an incline in the second position, wherein the incline is formed between the upper edge of the first sidewall and the outer edge of the floor.

3. The apparatus of claim 1, wherein the liner is moved into the second position by pulling a top of the liner.

4. The apparatus of claim 1, wherein one or more cables are attached to the liner.

5. The apparatus of claim 4, wherein the one or more cables are used to move the liner from the second position to the first position.

6. The apparatus of claim 4, wherein a mechanism is used to retract the one or more cables.

7. The apparatus of claim 6, wherein the mechanism comprises a roller system.

8. The apparatus of claim 1, wherein a continuous piece of material is horizontally attached to the liner.

9. The apparatus of claim 8, wherein the continuous piece of material is used to move the liner from the second position to the first position.

10. The apparatus of claim 9, wherein a mechanism is used to retract the continuous piece of material.

11. The apparatus of claim 10, wherein the mechanism comprises a roller system.

12. The apparatus of claim 1, wherein the upper edge of the wall comprises a powered roller mechanism.

13. The apparatus of claim 1, wherein the outer edge of the floor comprises a powered roller mechanism.

14. An apparatus for unloading bulk material, comprising:
a container for storing or transporting the bulk material, the container comprises a front wall, a rear wall, a first sidewall, a second sidewall, and a floor;
a liner positioned inside the container against the first sidewall and the floor;
wherein the floor comprises an outer edge at the second sidewall and an inner edge at the first sidewall;
wherein the first sidewall comprises an upper edge and a lower edge at the inner edge of the floor;
wherein the liner comprises an upper edge attached to the upper edge of the first sidewall and a lower edge attached to the outer edge of the floor;
wherein the second sidewall comprises a door attached to the outer edge of the floor;
wherein the liner can be in a first position or a second position;
wherein the bulk material is loaded onto the liner in the first position; and
wherein the liner is moved into the second position to facilitate the unloading of the bulk material through the door of the second sidewall.

15. The apparatus of claim 14, wherein the door comprises a flexible material and wherein the door may be in a closed position or an open position.

16. The apparatus of claim 15, wherein sides of the door are attached to the container in the closed position.

17. The apparatus of claim 15, wherein the door comprises an upper part attached to the container in the closed position.

18. The apparatus of claim 15, wherein the liner is moved into the second position by pulling at least a portion of the liner over the upper edge of the wall.

19. The apparatus of claim 15, wherein the upper edge of the first sidewall comprises a roller mechanism.

20. The apparatus of claim 19, wherein the roller mechanism is used to retract the liner and move the liner to the second position.

21. The apparatus of claim 15, where in the door is attached to the container by a clamp mechanism in the closed position.

22. The apparatus of claim 15, where in the door is attached to the container by a zip mechanism in the closed position.

23. The apparatus of claim 14, wherein the liner forms an incline in the second position, wherein the incline is formed between the upper edge of the first sidewall and the outer edge of the floor.

24. The apparatus of claim 14, wherein the liner is moved into the second position by pulling on a top of the liner.

* * * * *